US00RE35866E

United States Patent [19]

Simmons

[11] E Patent Number: Re. 35,866

[45] Reissued Date of Patent: Aug. 4, 1998

[54] APPARATUS FOR PRODUCING VARIABLE-PLAY FOUNTAIN SPRAYS

[76] Inventor: Thomas R. Simmons, 3510 Lobit, Dickinson, Tex. 77539-4310

[21] Appl. No.: 801,137

[22] Filed: Feb. 18, 1997

Related U.S. Patent Documents

Reissue of:

[64] Patent No.: 5,524,822
Issued: Jun. 11, 1996
Appl. No.: 402,651
Filed: Mar. 13, 1995

[51] Int. Cl.[6] ..... B05B 17/08

[52] U.S. Cl. ..... 239/17; 137/625.11; 137/625.17

[58] Field of Search ..... 239/16–19; 137/625.17, 137/625.11, 624.15

[56] References Cited

U.S. PATENT DOCUMENTS

| | | | |
|---|---|---|---|
| 3,372,371 | 3/1968 | Lesser et al. | 137/625.17 X |
| 3,893,481 | 7/1975 | Watts | 137/625.17 |
| 3,941,154 | 3/1976 | Bishop | 239/17 |
| 4,177,927 | 12/1979 | Simmons | 239/101 |
| 4,479,512 | 10/1984 | Ohrendorf et al. | 137/625.17 |
| 4,580,602 | 4/1986 | Boody | 137/625.17 |
| 4,967,796 | 11/1990 | Meyer | 137/625.17 X |

FOREIGN PATENT DOCUMENTS

| | | | |
|---|---|---|---|
| 2002831 | 7/1971 | Germany | 239/17 |
| 3229336 | 2/1984 | Germany | 239/17 |

*Primary Examiner*—Lesley D. Morris
*Attorney, Agent, or Firm*—Marvin J. Marnock

[57] ABSTRACT

Fountain apparatus in which a valve (40B) in the liquid circulating system of a fountain is adapted to control liquid flow to one or more nozzles (73, 74) to effect movement and interaction of the streams dispersed therefrom to produce fountain displays. The valve includes a valve body having two or more outlets (71A, 71B, 72A, 72B), each connected by a conduit (71C, 71D, 71E, 71F) to deliver liquid to one or more single entry or multiple entry nozzles (73, 74), and a hollow valve element (46A) provided with two or more lateral openings (67–69) and an inlet port (66) connected to receive the circulating fountain liquid for transmission through said lateral openings. Reversible drive motors (56, 65) in drive connection with the valve element are adapted to impart linear axial movement and reversible axial rotation of the valve element to periodically position the valve element lateral openings in communication with the valve outlets to control the distribution of liquid to the nozzles. Each valve element opening is provided a size and shape which interacts with a valve body outlet or aligned pairs of valve body outlets to vary the timing and volume of liquid delivered to one or more entry ports of a nozzle or an array of nozzles and thereby control the output and movement of a nozzle dispersal stream and its interaction with other nozzle dispersal streams.

22 Claims, 5 Drawing Sheets

APPARATUS FOR PRODUCING VARIABLE-PLAY FOUNTAIN SPRAYS

Matter enclosed in heavy brackets [ ] appears in the original patent but forms no part of this reissue specification; matter printed in italics indicates the additions made by reissue.

FIELD OF THE INVENTION

This invention relates to methods and apparatus for producing fountain sprays of various configurations and arrangements and for manipulating such sprays in complex movements for producing aesthetically appealing and entertaining displays.

BACKGROUND OF THE INVENTION

Fountains are customarily designed to produce spectacles which are aesthetically pleasing and entertaining. The fountain sprays or dispersal streams may be formed in various shapes and sizes. They may also be adapted to move in periodic and synchronized fashion for producing moving images and may include the use of light beams of different colors which are played on the fountain streams and sprays, oftentimes accompanied by music. The contemporary fountains and the control systems associated therewith are usually complex and costly in fabrication and maintenance and incorporate numerous valves, intricate mechanical systems and computer controls, particularly when the movements of the fountain sprays or streams are other than uni-directional or merely back-and-forth.

Apparatuses for shaping and positioning fluid dispersal streams which can be used in fountain displays as shown in U.S. Pat. Nos. 4,002,293 and 4,177,927 are of relatively simple and reliable construction but do not provide means for achieving a wide range of complex movements and interaction of fountain dispersal streams as are desirable in fountain design.

SUMMARY OF THE INVENTION

In the present invention novel apparatus is provided wherein a single unique valve incorporated in the liquid circulating system of a fountain is adapted to control the liquid flow to one or more nozzles and the streams dispersed therefrom to effect the movements and interaction of such streams to produce fountain displays of unusual variety and beauty. The valve of the apparatus includes a valve body provided with at least two or more outlet ports, each of which is connected by a conduit to deliver liquid to one or more single entry and multiple entry nozzles, and a partially hollow cylindrical valve element connected to receive the circulating fountain liquid therein and itself provided with two or more lateral openings. The apparatus further includes means for imparting reciprocating linear axial movement and reversible axial rotation of the valve element to periodically position the valve element openings in fluid communication with the valve outlet ports to thereby control and vary the distribution of the fountain liquid to each of the outlet ports and the nozzle connected thereto. Each of the valve element openings is provided a size and shape which interacts with a valve body outlet port or aligned pairs of valve outlets to vary the timing and the amount of fountain liquid delivered to one or more input ports of a fountain nozzle or an array of fountain nozzles and thereby effect the output and movement of the stream dispersed by the nozzle and its interaction with or relation to others of the fountain dispersal streams in such fashion as to produce spectacles of unusual beauty and illusions created by constantly moving images.

DETAILED DESCRIPTION OF THE DRAWINGS

The fountain system of the present invention is designed to make possible the creation of innumerable varieties of ever-changing water displays. The system relies principally on multiple-entry nozzles wherein two or more streams of pressured flows supplied to a nozzle are merged at or just outside the nozzle exit to produce a third stream which may conveniently be adjusted and controlled in size, shape, movement and duration by selectively varying either the flow rate or the quantity of any of the supplied pressure flows relative to the others.

Figure 1:
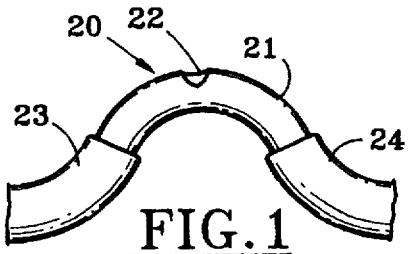
FIG. 1 is a side view of a dual-entry nozzle which is adapted for use in a fountain display system in accordance with the invention.

Referring more particularly to the drawings, there is shown in FIG. 1 a nozzle 20 which is adapted for use as a component in the fountain system of the present invention. The nozzle 20 is constructed from a U-shaped tube 21 having a wedge shaped aperture 22 which forms the nozzle exit, such as shown in U.S. Pat. No. 4,177,927. Two pressured flows of water are delivered by conduits 23, 24 connected at opposite ends of the tube 21 to therein blend and produce a third stream which is dispersed from the nozzle exit 22. The direction and flow rate of the third stream may be adjusted by selectively varying the flow rate or pressure of one or both of the pressured flows conveyed by the conduits 23, 24. In some systems the lengths of the conduits 23, 24 result in friction losses produced in the conduits which diminish the degree of control of the pressure flows to the nozzle. Accordingly, the conduits 23, 24 are designed with a greater internal diameter than that of the U-shaped tube 21 such that the effects of friction on the liquid flow to the nozzle entry ports is substantially eliminated.

The dual-entry nozzle 20 is particularly suited for use where a back-and-forth motion of the dispersal stream is desired, which can be accomplished by selectively increasing the flow in one conduit as compared with the flow in the other, or to re-position the nozzle dispersal stream in an instantaneous manner by abruptly transferring a full pressure flow from one input port to the other.

Figure 2:
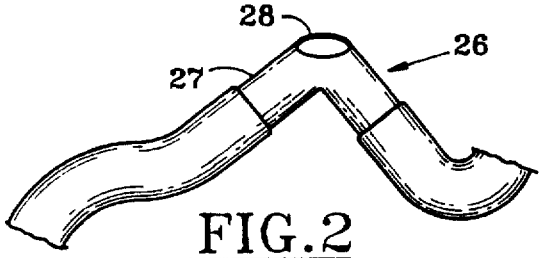
FIG. 2 is a side view of another form of dual-entry nozzle disclosed in the prior art which is adapted for use in the fountain display system of the invention.

Another dual entry nozzle 26, disclosed in the prior art and shown in FIG. 2, which can also be used in the fountain system of the invention comprises a V-shaped tube 27 with an exit aperture 28 provided at the apex of the tube. As with the nozzle 20, instantaneous re-positioning or a back-and-forth uniplanar movement of the dispersed stream from the nozzle 26 is readily achievable. With the nozzle 26, when the two pressured flows are delivered from opposite ends of tube 27 they are merged just outside the exit aperture at a location which can be adjusted by changing the angle of juncture of the legs of the V-shaped tube.

Figure 3:
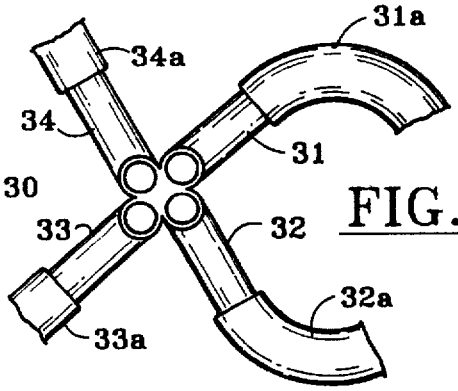
FIG. 3 is a top plan view of a nozzle with four entry pipes, which nozzle can also be used in a fountain display system in accordance with the invention.

For more complex movements of the dispersal stream, a multiple entry nozzle such as the nozzle 30 in FIG. 3 is provided. In the nozzle 30, four linear tubes 31–34 are each at one end connected to larger diameter supply conduits 31a–34a, respectively, and arranged in a pyramidal relationship with their outlet ends joined at the apex of their pyramidal orientation, such that the dispersal streams emitting therefrom will merge at a location closely adjacent to the outlets to produce a single dispersal stream. By selectively varying the liquid flow in each of the conduits 31a–34a with respect to the others, the merged dispersal stream may be made to move in a complex manner such as, for example to describe a cone or similar geometric form by its movement.

Figure 6:
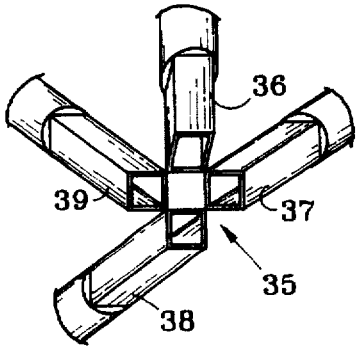
FIG. 6 is a perspective fragmentary view of a multiple-entry nozzle which is suitable for use in the fountain display system of the present invention.

Another multiple entry nozzle 35 which can also be used in the invention is shown in FIG. 6. The nozzle 35 is similar to the nozzle 30 except that the linear feed tubes 36–39 which deliver pressured flows at their outlets are of rectangular cross section such that the single dispersal stream produced by their collision and merger will have an irregular cross section other than circular.

Figure 4:
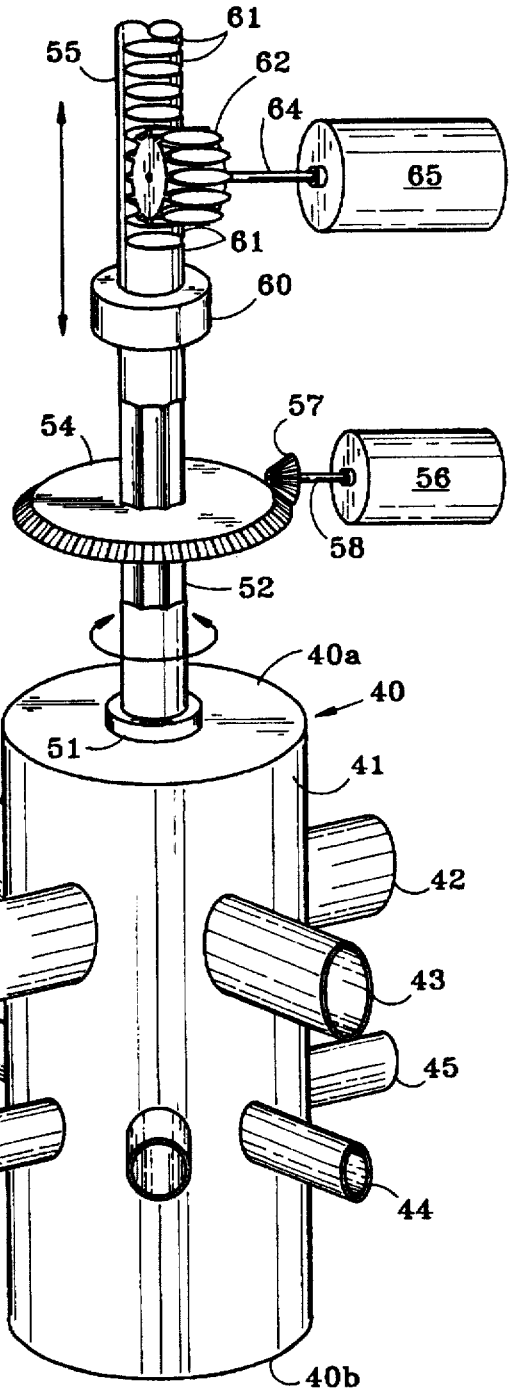
FIG. 4 is a perspective view of a diverter valve which is an essential component of the fountain display system of the present invention.
Figure 5:
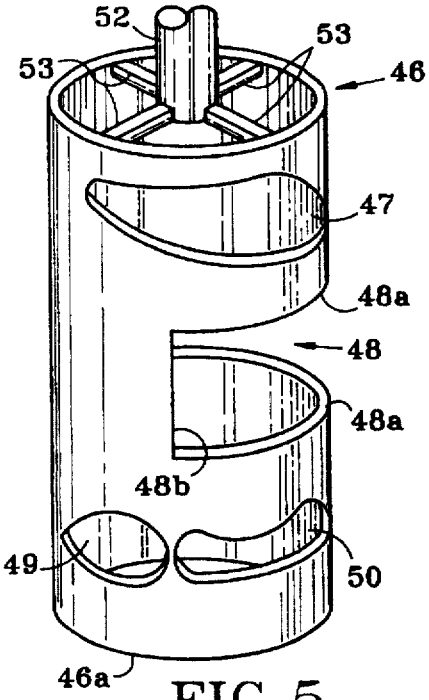
FIG. 5 is a perspective view of the valve element used in the valve of FIG. 1.
Figure 7:
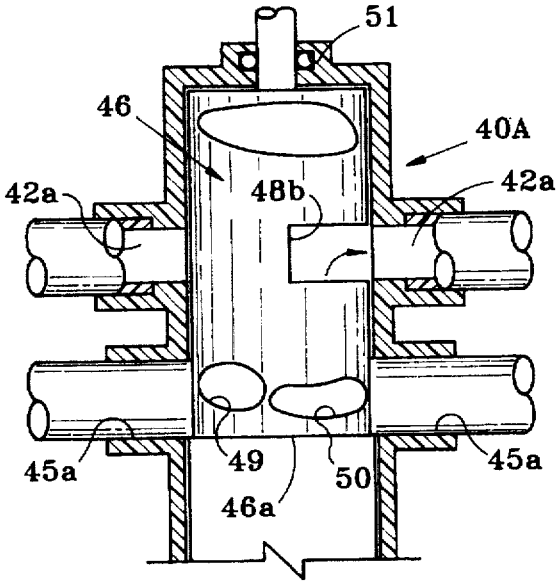
FIG. 7 is a longitudinal sectional view of the valve of FIG. 5 with the valve element of FIG. 2 installed therein.

For controlling the liquid flow to the supply conduits which feed the various nozzles in the fountain display system, a valve 40 as shown in FIG. 4 is provided which is adapted for installation in the liquid circulating system for the fountain which includes a pump or other source of liquid pressure (not shown). The valve 40 comprises a cylindrical valve body 41 which is open at one end 40b and provided with numerous outlets which are arranged in coaxially aligned pairs such as the pairs 42, 43, 44 and 45. Each valve outlet is connected in fluid communication with a nozzle supply conduit or an appropriate tubular adapter to which a conduit may be connected. The valve 40 also includes an open-ended cylindrical tubular valve element 46 as shown in FIG. 5 which is of a size to fit snugly within the valve body by its installation in the valve body 40 or a valve body 40A as shown in FIG. 7 which is substantially identical to the valve body 40 except for the locations of the pairs of coaxial outlets. The valve element 46 is also provided with lateral openings 47–50.

As installed in the liquid circulating system of the fountain, the unobstructed open end 46a of the valve element 46 receives the pressurized fountain liquid. When the valve element is positioned in the valve body with one of its lateral openings aligned with and in fluid communication with one or more of the valve outlets, fountain liquid is distributed through the communicating valve outlets and their associated conduits for delivery to a fountain nozzle or nozzles.

It is also to be seen in FIGS. 4 and 5, that the valve 40 is provided with a valve stem 52 which is connected to one end of the valve element 46 in coaxial alignment therewith by means of radially extending braces 53. The valve stem 52 extends through the transverse annular end 40a of the valve body 41 in sealing relationship therewith as provided by a stem seal 51, as shown in FIG. 7, which permits axial rotation and linear sliding movement of the valve stem 52 while retaining a seal.

To permit selective axial rotation of the valve stem 52, the valve stem 52 is fitted with an annular bevel gear 54 which is in drive connection with a reversible motor 56 by means of a drive connection with a gear 57 on the motor drive shaft 58. The speed and direction of rotation of the motor 56 may be programmed by either manual or electronic means to place the lateral openings of the valve element in communication with a coaxial pair of valve outlets in a timed relationship determined by the speed of rotation and the relative shape of a valve element lateral opening to the shape of the valve outlet aligned therewith which relationship also controls the degree of fluid communication between the valve outlet and a valve element opening.

In addition, to permit linear axial movement of the valve stem 52 and communication of a valve element lateral opening with other coaxial pairs of valve outlets which are displaced from adjacent pairs in the longitudinal direction of the valve body, a linear drive means is provided. Such means comprises a swivel or roller bearing connection 60 which is fitted on the upper end of the valve stem 52 and supports a shaft formed as a rack 55 in coaxial alignment with the valve stem 52. The connection 60 allows axial rotation of the valve stem 52 as the shaft 55 remains non-rotational. In addition, the shaft or rack 55 is provided with a linear arrangement of gear teeth 61 along a portion of its length which are disposed in cooperative engagement with an annular bevel gear or pinion 62 fitted on a motor drive shaft 64 of a second reversible motor 65. The motor 65 can be operated to impart linear axial movement to the shaft 55 and the valve stem 52 in a selected direction and thereby control the direction of communication between a valve element opening and valve outlet and also the timing of placement of a valve element lateral opening in fluid communication with other valve outlets which may include sequential pairs of coaxial valve outlets.

Figure 9:
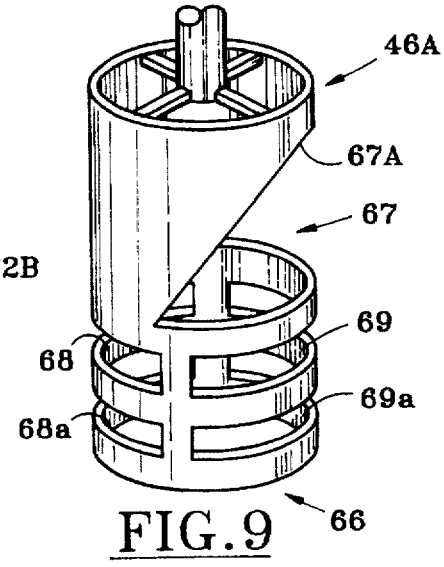
FIG. 9 is a perspective view of a valve element used with the valve of FIG. 8.

It will be seen in FIGS. 5 and 7 that the valve element 46 is provided with a lateral opening 48 which is defined by curved edges 48a which extend radially to the axis of the valve element and straight edges 48b which extend vertically in the axial direction thereof. When the opening 48 is aligned with one of the valve outlets of a coaxial pair of valve outlets as shown by outlets 42a in FIG. 7, all of the liquid flow delivered to the valve 40A is communicated to one valve outlet while the other is deprived of liquid. As the valve element 46 continues to rotate, the communication is reversed such that if the pair of valve outlets are connected to a dual entry nozzle, an instantaneous re-positioning or flip-flop of the nozzle dispersal stream would ensue. However, for a similar tubular valve element 46A having an inlet 66 at one end and provided with a lateral opening 67, as shown in FIG. 9, with an edge 67A at an angle to the cylinder axis of the valve element and wherein the opening 67 extends almost completely around the valve element, both of the coaxial valve outlets of a valve, such as the valve 40A, can be in fluid communication with the lateral opening 67 to greater or less degree such that the flow to one of the valve outlets is increasing as the other is decreasing, thereby resulting in a fanning action of the nozzle dispersal stream.

Figure 8:
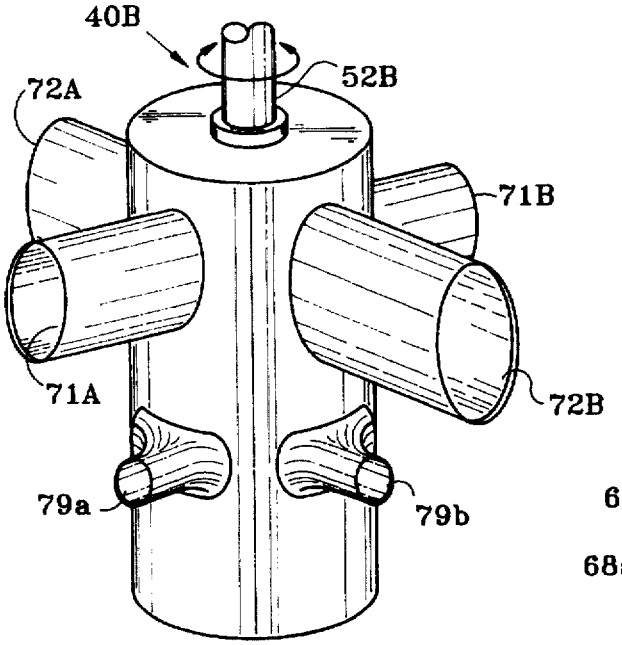
FIG. 8 is a perspective view of another form of diverter valve which can be used in the fountain display system of the present invention.

It is to be noted that the valve element 46A is a modified form of the valve element 46 in that it is provided with different shaped lateral openings such as openings 67, 68 and 69. It is nevertheless designed to operate in similar fashion, when sized appropriately and installed in the valves 40 or 40A. It is also intended for use in a valve 40B as shown in FIG. 8, which differs from the valves 40 and 40A only in the locations and configurations of the valve outlets which are provided in the valve body. It is also to be understood that the valve element 46A is adapted for connection to a valve stem 52B, identical to the valve stem 52, and the valve 40B is provided with identical means by which linear axial movement and axial rotary movement may be imparted thereto.

It is also to be appreciated that the angular opening 67 of the valve element 46A allows for interesting variation in fountain dispersal stream movements when contrasted with that which can be achieved by provision of the vertical edge opening 48 of the valve element 46. From an initial position of full communication with the valve outlet 42a, the imposition of a vertical axial movement to the valve element 46 which does not exceed the length of the vertical edge 48b does not alter the arc of movement of the nozzle dispersal stream. In contrast, an axial movement of the valve element 46A from an initial position of full communication with an outlet 42a, will operate to shorten the arc of movement of the nozzle dispersal stream. Also, as the axial movement continues the volume of water which is switched from side to side in a nozzle decreases to a condition of near equal volumes to its dual entries with the result that the nozzle dispersal stream stands steady at the midway position of its arcuate movement.

The phenomenon of a fanning action of a nozzle dispersal stream as described above is illustrated in FIGS. 18a, 18b and 18c of the drawings. As shown in FIG. 18b, a valve 40B as shown in FIG. 8 is provided with two pairs of coaxial outlets 71A, 71B and 72A, 72B with the axis of one pair intersecting at right angles to the axis of the other pair. The outlets 71A, 71B are connected by conduits 71C, 71D to a pair of manifolds 71F, 71E respectively and the outlets 72A, 72B are connected by conduits 72C, 72D to a pair of manifolds 72E, 72F, respectively. The manifolds, which are rectangular in transverse cross section and of far greater cross sectional area than the conduits 71C, 71D and 72C, 72D, may be used to facilitate the attachment of nozzles to their supply conduits, to hide some of the nozzle tubes, or for decorative purposes.

The valve 40B is provided with a valve element 46A, as shown in FIG. 9, and when axial rotation is imparted to the valve element 46A, its lateral opening 67 will be communicated with the valve outlets in a manner such that the fountain liquid will be delivered in gradually increasing and decreasing amounts to each of the valve outlets 71A, 71B, 72A and 72B in each period of time corresponding to a complete revolution of the valve element. The varying flow in the valve outlets 71A, 71B controls the direction of the dispersal stream from the dual entry nozzle 74 which is supplied by the manifolds 71E, 71F. Similarly the varying flow in the outlets 72A, 72B control the nozzle 73 which connects with manifolds 72E, 72F.

Figure 18C:
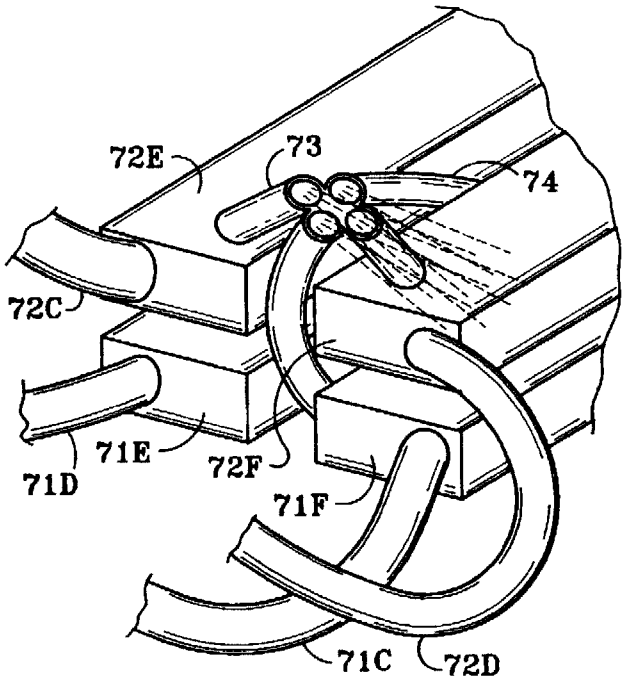
FIG. 18c is a fragmentary perspective view of a unique arrangement of nozzles in a fountain system which incorporates the valve shown in FIG. 18b.
Figure 18B:
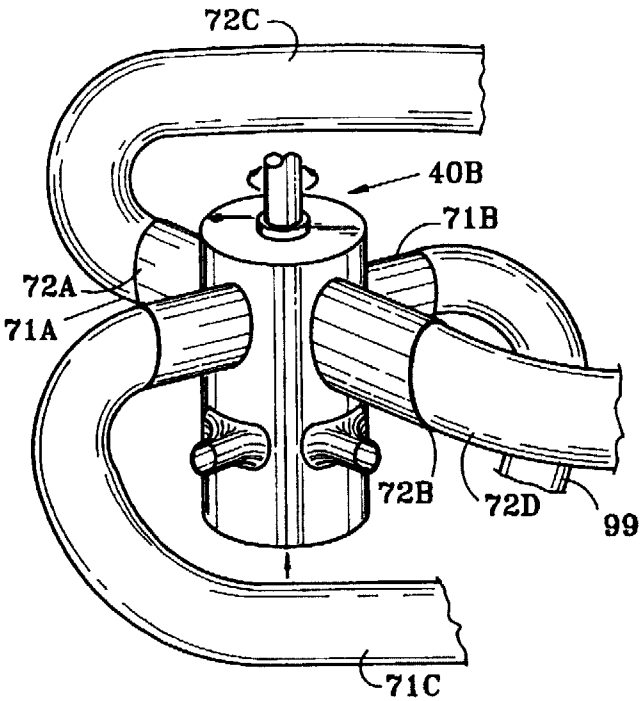
FIG. 18b is a fragmentary perspective view of the valve used in the fountain display system as shown in FIG. 18c.
Figure 18A:
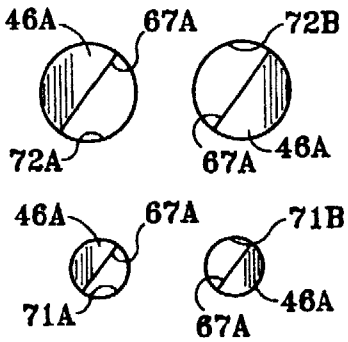
FIG. 18a is a schematic diagram which illustrates for a given instant the degree of closure of two pairs of coaxial outlet ports in a valve which includes a valve element as shown in FIG. 9 and is incorporated in a fountain display system.

A graphical representation of the degree of closure of the valve outlets 71A, 71B at a given instant of time is shown in FIG. 18a. The upper pair of circles in FIG. 18a represent the outlets 72A and 72B and in each circle the straight line chord which intersects two points of the circle represents the angled edge 67A of the lateral opening 67 in the valve element 46A. It will thus be seen that for a given instant, the valve element 46A is in a position such that the valve outlet 72A is largely occluded by the valve element whereas the outlet 72B is occluded to a lesser degree. The pressurized flow of fountain liquid is therefore greater in the outlet 72B than the outlet 72A and therefore delivers more fluid to the manifold 72F than is delivered to the manifold 72E.

For the outlets 71A, 71B, represented by the lower pair of circles in FIG. 18a, the valve element 46A closes each outlet equally such that the liquid flows to the dual branches of the nozzle 74 are equal.

As seen in FIG. 18C, the four dispersal streams from the nozzles are merged to form a larger stream with a scanning action in similar fashion to the beam of a searchlight scanning the skies, the direction of the beam being controlled by the relative power of the merging streams.

Figure 11:
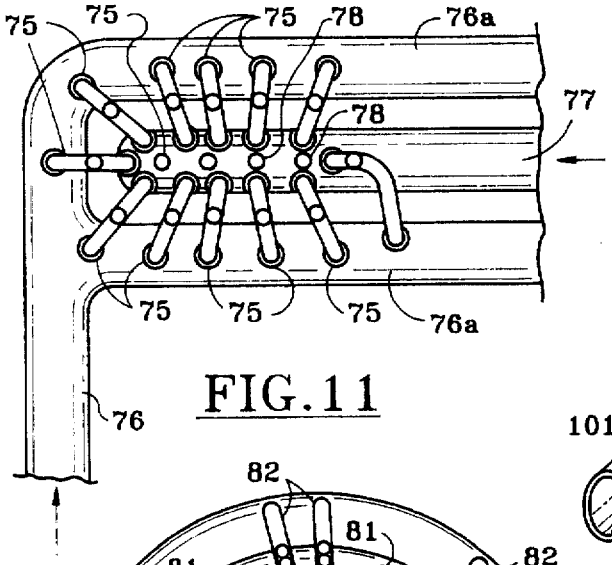
FIG. 11 is a fragmentary top plan view of a modified form of the fountain display system of the present invention.

In FIG. 11 there is shown a fountain display which utilizes a plurality of dual-entry nozzles 75, each connected by its tubular end to a pair of conduits 76, 77 from a pair of coaxial valve outlets. One of the conduits 76 is provided with two parallel branches 76A, 76B with the other conduit 77 positioned centrally therebetween and in parallel therewith. The central conduit 77 is provided with a linear array of four single entry nozzles 78 for producing laminar stick-like dispersal streams which are surrounded by the dispersal streams from the plurality of dual-entry nozzles 75, each of which is connected to both of the conduits 76A, 76B to receive pressured flow therefrom. With the conduits 76, 77 connected to a valve 40B and outlets 71A, 71B as shown in FIG. 18b and the valve is provided with a valve element 46A as shown in FIG. 9, rotation of the valve element produces fluid communication of its lateral opening 67 with the coaxial valve outlets such that as the flow in conduit 76 is increasing, the flow in conduit 77 is decreasing which results in all dispersal streams from the dual entry nozzles 75 moving towards the laminar flows from the nozzles 78. The laminar streams will also decrease in height as the dispersal streams from the nozzles 75 move inward and will increase in height as the dispersal stream from the nozzles 75 move outward, thereby simulating the pistils of an opening flower which grow as the flower opens to full size and shrink as the flower closes.

Figure 12:
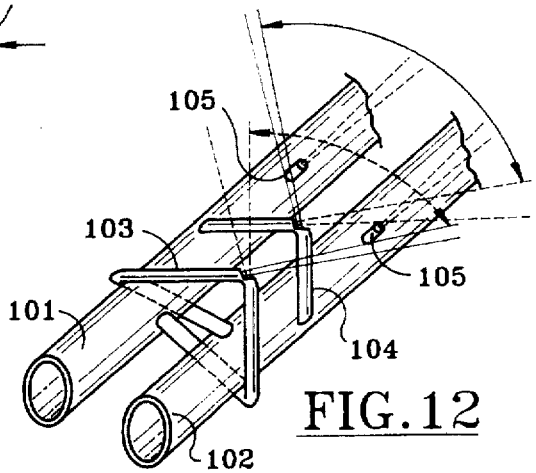
FIG. 12 is a top plan view of another modified form of the fountain display system of the invention.

In FIG. 12 there is shown a fountain display which can also be produced by a fountain system of the present invention. The conduits 101, 102 preferably connect to different ones of a pair of coaxial valve outlets to deliver fountain liquid to a pair of dual entry nozzles 103, 104, each of which is similar to the nozzle 26 of FIG. 2. When connected to a valve, such as the valve 40A in FIG. 7, the rotation of the valve element 46 produces an instantaneous flip or re-position of the dispersal stream from each nozzle as shown in FIG. 12, from a first leftward position in substantial alignment with one branch of a nozzle to a second rightward position in substantial axial alignment with the other branch of the nozzle. With the nozzle 103 having its right branch connected to conduit 101 and its left branch connected to conduit 102, which is the reverse of the condition of nozzle 104, the dispersal stream from the nozzle 103 is in its leftward position when the stream from nozzle 104 is in its rightward position. It is also to be seen that each conduit 101 and 102 is provided with a single entry nozzle 105, 106 respectively, from each of which a single uni-directional laminar dispersal stream is produced. As the valve element rotates, the pressure flow to the nozzles 105 and 106 will alternate between completely OFF and completely ON when a lateral opening such as opening 48 is rotated therebetween. Alternatively, if the conduits 101, 102 are connected to a valve with a valve element 46A having a lateral opening 67, as shown in FIG. 9, the flow will increase and diminish in each conduit 101, 102 to produce a rise and fall of each laminar dispersal stream, such that as one stream is rising the other is falling. On the other hand and at the same time, the dispersal streams from the nozzles 103, 104 are moved in a fanning action.

Figure 13:
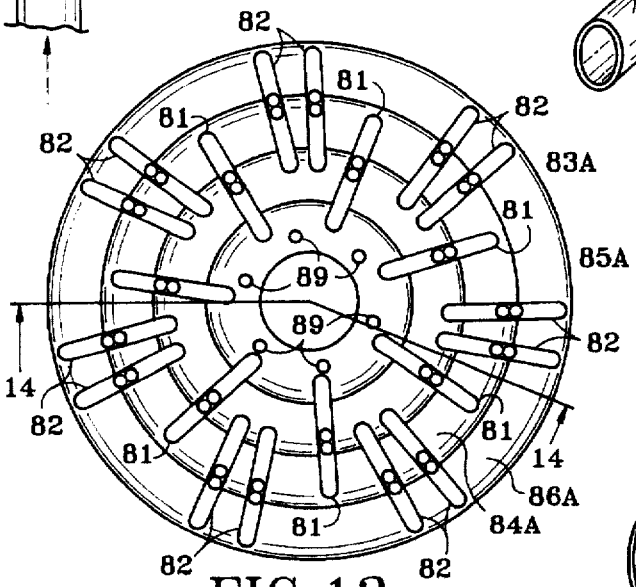
FIG. 13 is a perspective view of a further modified form of fountain display system of the invention.
Figure 14:
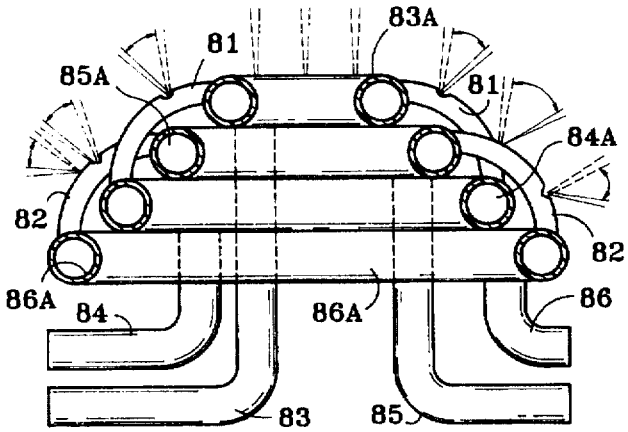
FIG. 14 is a sectional view as taken along the section line 14—14 in FIG. 13.

A more elaborate fountain display, which also is designed to simulate the opening and closing of a flower can be produced by a fountain nozzle arrangement as shown in FIGS. 13 and 14 when installed in a fountain liquid circulating system. The arrangement includes a plurality of dual entry nozzles 81 in an inner circle and a plurality of dual entry nozzles 82 positioned in a larger circle concentric to the circle of nozzles 81.

The nozzles 81 are each connected at their tube ends to toroidal portions 83A, 84A of a pair of conduits 83, 84 respectively which are, in turn each connected at one end to the coaxial outlet of a valve such as a connection of conduit 83 with the outlet 71A and a connection of conduit 84 with the outlet 71B of the valve 40B shown in FIG. 8. As seen in FIGS. 13 and 14, the conduits 83–86, each include an end portion in the form of a toroid 83A–86A respectively. The toroids are formed in parallel and are of different diameters. The toroid 86A has a diameter slightly larger than the diameter of toroid 84A, which in turn, is of slightly larger diameter than the toroid 85A, with toroid 83A being of smallest diameter. As shown in FIG. 14, the toroids are arranged in concentric fashion in a stack with the smallest toroid 83A seated atop toroid 85A, which seats atop toroid 84A, which seats atop toroid 86A.

In operation of the valve 40B, an axial rotation of the valve element 46A, increases the pressure flow in one branch of a dual entry nozzle as it decreases the pressure flow in the other branch, thereby producing a fanning action wherein all of the dispersal streams from the circle of nozzles 81 act in synchronism and are in similar positions throughout their arc of movement. In like fashion, the dispersal streams from the outer circle of nozzles 82 are similarly synchronized such that all move inwardly at the same time and then outwardly in synchronism like the closing and opening of a flower's petals. At the center of the arrangement, a circular array of single entry nozzles 89 are provided in the toroidal conduit 83A and accordingly simulate the pistils of a flower blossom which rise and fall together as the pressure flow in the conduit 83 alternately increases and decreases.

Figure 17:
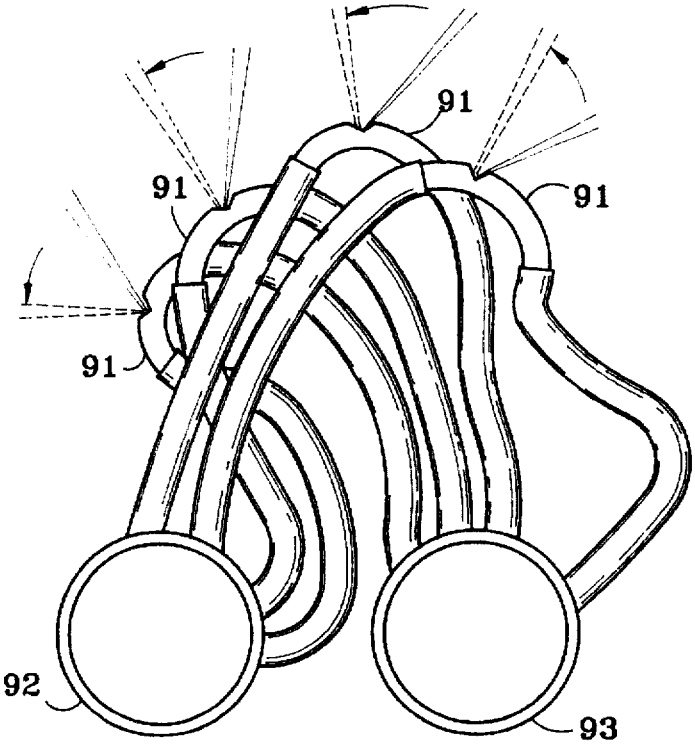
FIG. 17 is a side view of still another fountain display in which a plurality of nozzle dispersal streams are moved in sequence to simulate the moving spokes of a rotating wheel.

In FIG. 17, there is shown still another fountain display which can be produced by the fountain system of the present invention. The display is intended to provide the illusion of moving spokes, such as the spokes of a paddle wheel, which rise up from the water on the right, move towards the left and re-enter the water to the left in the Figure. This illusion is created by a plurality of dual-entry nozzles such as four nozzles 91, wherein the ends of their nozzle tubes are connected to the pair of conduits 92 and 93 respectively, which conduits are adapted for connection to coaxial valve outlets such as 72A, 72B of the valve 40B in FIG. 8. With a valve element 46A having an opening 67 as shown in FIG. 9, a half-way revolution of the valve element 46A in the valve 40B produces a uni-directional movement of each of the dispersal streams over a prescribed arc, all moving slowly in synchronism from their rightmost position to their leftmost position. An extremely fast completion of the other half revolution of the valve element 46A or a rapid linear axial movement of the valve element 46A and its opening 48 to the other valve outlets 45a will produce an instantaneous reversal of the streams to their leftmost position, thus creating the illusion of spokes of a wheel traversing the entire distance from rising out of the water on the right and sinking into the water on the left.

Figure 16:
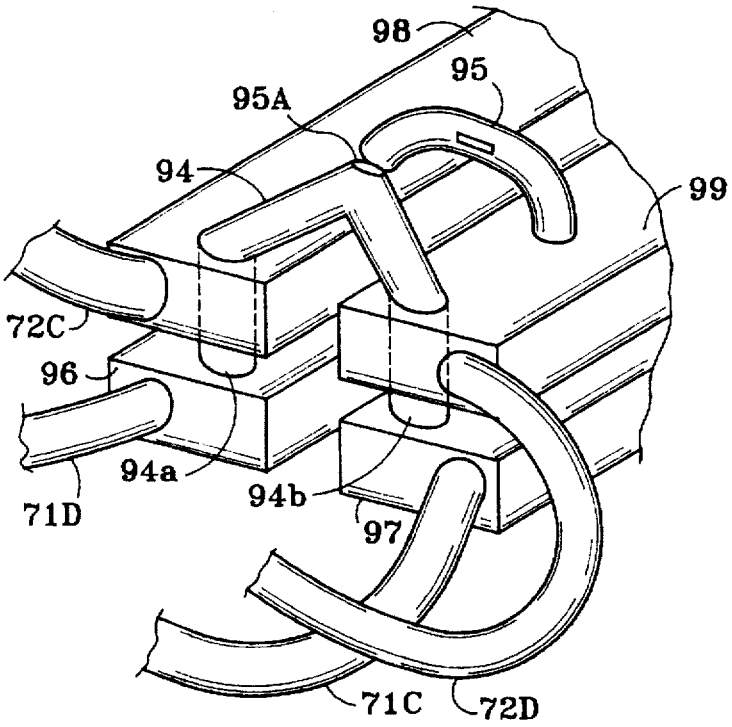
FIG. 16 is a fragmentary perspective view of another fountain display system of the invention in which enlarged ducts of rectangular cross section are employed to supply water to the fountain nozzles.

Another arrangement of fountain nozzles for a fountain display similar to that provided by the fountain apparatus in FIG. 18c is shown in FIG. 16, in that it includes a dual entry nozzle 94 mounted in a lower pair of manifolds 96, 97 and a dual entry nozzle 95 mounted in an upper pair of manifolds 98, 99. The apparatus of FIG. 16 differs principally from that in FIG. 18C by the orientation of the nozzles to one another and by their installation in the liquid supply manifolds 96–99, each of which is connected to a valve outlet by conduits substantially identical to the conduits 71C, 71D and 72C, 72D of FIG. 18C and accordingly provided with similar reference numbers. It is also to be noted that nozzle 94 includes a V-shape of nozzle tubing such as in the nozzle 26 of FIG. 2 and the nozzle 95 includes a curved tubing such as in the nozzle 20 of FIG. 1, although being provided with a rectangular shaped nozzle aperture 95A rather than a wedge-shaped aperture. It is also to be seen that the V-shape tubing of nozzle 94 includes parallel branch extensions 94a, 94b which are mounted such that the branch 94a extends through the upper manifold 98 to communicate with the lower manifold 96 and the branch 94b extends through the upper manifold 99 to communicate with the lower manifold 97. In this fashion a considerable length of the tubing which forms the nozzle 94 may be hidden from view for aesthetic purposes, when desirable.

Another modification is provided by the rectangular shaped aperture 95A of the nozzle 95 which shapes the fluid dispersal stream with an ovate cross section rather than circular as is characteristic of the stream which is dispersed from the nozzle 94. The two nozzles 94, 95 are also inclined towards one another and positioned with their apertures closely adjacent so that their streams will collide and merge as the two streams are moved together in a fanning action. If the two nozzle streams are moved asynchronously, their intermittent collisions will occur.

Figure 10:
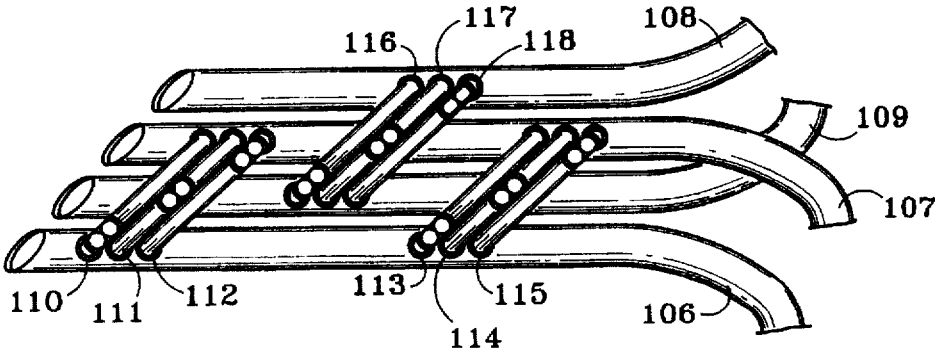
FIG. 10 is a fragmentary perspective view of a fountain display system of the present invention.

In FIG. 10, there is shown another arrangement of fountain nozzles which can be used in a fountain display in accordance with the invention. The arrangement comprises a first cluster of dual entry nozzles 110, 111, 112 and a second cluster of similar dual entry nozzles 113, 114, 115, all of which nozzles are connected at their opposite tube ends to a pair of conduits 106, 107. The arrangement also includes a third cluster of dual entry nozzles 116, 117, 118, which are disposed between the other two nozzles clusters, and are connected at their tube's ends to a pair of conduits 108, 109 respectively. All of the conduits are arranged in parallel and interlaid such that the conduit 107 is disposed between conduits 108 and 109.

The conduits 106 and 107 are adapted for connection to a first pair of coaxial valve outlets such as the outlets 72A and 72B of the valve 40B in FIG. 8. The conduits 108, 109 are adapted for connection to a second pair of smaller valve outlets, such as the pair 71A, 71B of FIG. 8. The significant feature of this design of a fountain display, is the phenomenon that the nozzle dispersal streams from the first gang of nozzles (110–112 and 113–115) travel in their arcs at a different speed from the second gang of nozzles (116–118), no matter how fast the valve element 46A rotates in the valve 40B. Because they are connected to larger outlets, the first gang of nozzles will produce slower moving dispersal streams than the dispersal streams from the second gang of nozzles, which go from a full open condition to a full closed condition in a shorter period of time and complete their back and forth cycle of arcuate movement in a shorter period of time. Also, it is to be noted that there will be a larger "stand still" hesitation at the end of each arc of movement when the width of the valve body outlet is not as long as one half of the body circumference.

Heretofore, the movements of the nozzle dispersal streams which are producible by the various arrangements of fountain nozzles shown in FIGS. 11–14 and 16–18 have been primarily described as they are produced by an axial rotation of a valve element 46 or 46A. However, it is also possible to impart a linear axial movement to the valve element in combination with axial rotary movement or to impart only linear axial movement thereto. It is to be appreciated that linear axial movement provides an additional variable in the production of a nozzle dispersal stream which can adjust the period of communication of a valve outlet with a valve element opening and the relative quantity of liquid flow to the conduits connecting with a nozzle, thereby, for example, permitting adjustments in the height and timing of a dispersal stream during a fanning action so as to provide hesitations in the stream movement or periodic terminations of the dispersal streams.

Further complexity to the movement of a dispersal stream from a dual entry nozzle can also be achieved by providing a valve 40, 40A or 40B with a valve element having odd shaped openings such as the openings 47, 49 and 50 in the valve element 46 shown in FIG. 5 which odd shapes effect the timing of communication with a valve outlet and the flow thereto. It is also to be appreciated that several nozzle arrangements and fountain displays can be produced and controlled by a single valve, as for example, by connecting conduits 83–86 shown in the fountain system in FIG. 13 to the pairs of valve outlets 42, 43 of valve 40 and conduits 101, 102 of the fountain shown in FIG. 12 to the pair of outlets 44. At the same time, outlets 75 and 76 shown in the fountain of FIG. 11 might also be connected to the pair of valve outlets 45.

It is also to be noted that a valve body can be provided with funnel-shaped valve outlets 79A, 79B as shown in the valve of FIG. 8. Since these outlets in the valve body wall are of larger area than the cross section of the conduit which connects thereto at the narrow end of the funnel, a funnel-shaped outlet will receive an initially large volume of fountain liquid when first in communication with a valve element opening, which volume as compared to its coaxial partner, will induce a hesitation in fanning action of a dispersal stream from a dual entry nozzle, which hesitation will occur when the dispersal stream is at the extremes of its arcuate movement.

These funnel shapes for the valve outlets are also generally required when the lateral outlet openings in the valve body and the valve element are of odd or unusual shapes such as a long narrow slot or shapes characterized by complex curvatures. In such cases, the funnel connected at the valve outlet serves to convert the odd shape opening to an equivalent conventional pipe sized opening which is an important consideration in the determination of a practicable liquid pressure and pump size for a fountain system.

Figure 15:
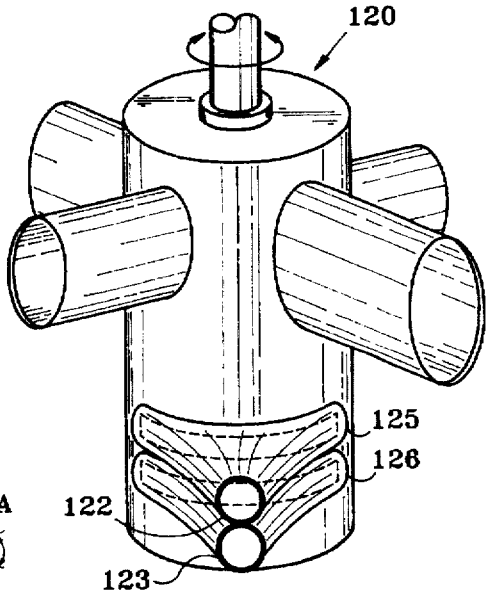
FIG. 15 is a perspective view of another form of diverter valve which can be used in a further modification of the fountain display system of the invention.

Another illustration of a valve body with funnel shaped valve outlets is shown in FIG. 15 by the valve body 120. The valve body 120 is similar to the valve body of valve 40B shown in FIG. 8 but differs principally therefrom in the location of the funnel shaped outlets 122,123 which are superposed one atop the other in the axial direction of the valve body and communicate with elongate narrow openings 125, 126 in the valve body, which openings of rectangular cross section are shown in dashed lines in the drawing and are similarly configured to the openings of the funnels connecting thereto.

It is to be appreciated that the valve body 120 is particularly suited for use with a valve element such as the valve element 46A in FIG. 9 which has two pairs of slotted openings 68, 68a, and 69, 69a in addition to its angular opening 67. Each of the slotted openings 68–69a is identical in size and configuration to the valve body openings 122, 123 and each pair is similarly configured and spaced to the pair of valve body openings 125, 126.

An important feature of the funnel shape is that is serves to convert the slotted valve opening to an equivalent circular pipe size outlet in that the circular cross section of the connecting conduit at the narrow end of the funnel is approximately the same as that of a slotted valve opening 125 or 126, which configuration facilitates a rapid change in dispersal stream position by a short vertical movement of the valve element 46A.

Another variable for control of a fountain's dispersal streams is also provided by the reversible motors 56 and 65, either of which can be adjusted as to its operational speed or direction of rotation. Manual or electronic controls can be used to program the operation of the motor in an almost limitless fashion and therefore provide an almost limitless variety of fountain stream movements and interactions.

A principal purpose of linear axial movement of a valve element is to change the height of the dispersal streams when this is a desired feature in a fountain display. It can also be used to re-program the fountain display to provide an entirely new spectacle as when the valve element openings are moved to a different set or sets of valve outlets. Also, while the valve element is described herein as a tubular cylindrical element with a hollow interior, it might also be of a predominantly solid form which is provided with a flow passage, an entry port at one end and a plurality of lateral openings which communicate with the entry port by means of the flow passage.

It is also to be appreciated that the foregoing description of the invention has been presented for purposes of illustration and explanation and is not intended to limit the invention to the precise form disclosed. For, example, one of the coaxial valve outlets in the valve 40, 40A, or 40B can be larger than the other coaxial outlet with which it is paired with the result that the dispersal stream is shortest at one extreme position of its arcuate fanning movement and longest at the other extreme of the arc. It will also linger at the end of the arc where it is largest. In addition, an air injection means which might include an air compressor or the like, can be installed at various places in the system to inject air into one or more of the dispersal streams to produce a white frothy appearance if so desired. It is to be appreciated therefore, that various changes may be made in the apparatus by those skilled in the art without departing from the spirit of the invention.

I claim:

1. A fountain apparatus for producing fountain streams and sprays wherein the streams and sprays are adapted to move in complex fashion to provide aesthetically pleasing and entertaining displays, said apparatus comprising:

a valve adapted for installation in a fountain liquid circulating system, said valve comprising a valve body having a valve chamber therein and an inlet port and a plurality of outlets in communication with said chamber, said inlet port being adapted for connection in communication with a source of liquid under pressure;

a tubular valve element, said valve element being formed with a longitudinal axis and a hollow interior with an entry port at one end and a plurality of lateral openings in communication with said entry port, said valve element being mounted in said valve chamber with its entry port in fluid communication with the inlet port of the valve body whereby liquid delivered through the inlet port of said valve body is received by said valve element;

said plurality of outlets of the valve body comprising a pair of outlets which are coaxially aligned with one another in diametrically opposed relationship with respect to the axis of said tubular element;

liquid discharge means for discharging fountain liquid, said discharge means comprising at least one nozzle having an exit aperture for discharging fountain liquid therefrom and a plurality of nozzle entry ports adapted to receive liquid therethrough;

conduit means for connecting each of said valve outlets with a different one of said nozzle entry ports;

means for imparting axial rotation to said valve element at a selected speed and direction of rotation to selectively control the degree and duration of fluid communication of said valve element lateral openings with said valve outlets; and means for imparting linear axial movement to said valve element at a selected speed and direction of axial movement to further control the fluid communication of said valve element lateral openings with said valve outlets whereby when said valve is connected with its inlet port in communication with a source of liquid under pressure, the valve element may be actuated to effect complex movements of the fountain dispersal streams.

2. A fountain apparatus as set forth in claim 1 wherein said valve body is provided with first and second pairs of valve outlets and the outlets of each said pair are coaxially aligned with one another in diametrically opposed relationship with respect to the axis of the tubular valve element and wherein said liquid discharge means comprises first and second arrays of dual entry nozzles, each nozzle in said arrays having a pair of nozzle entry ports and an exit aperture communicating with both of the nozzle entry ports;

a first pair of conduits, each connecting at one end to a different one of the first pair of valve outlets with one conduit of said first pair of conduits connecting at its other end to one entry port of each dual entry nozzle in said first array of dual entry nozzles and the other conduit of said first pair of conduits connecting at its other end to the other entry port of each dual entry nozzle in said first array of dual entry nozzles;

a second pair of conduits, each connecting at one end to a different one of the second pair of valve outlets with one conduit of said second pair of conduits connecting at its other end to one entry port of each dual entry nozzle in said second array of dual entry nozzles and the other conduit of said second pair of conduits connecting at its other end to the other entry port of each dual entry nozzle in said second array of dual entry nozzles, each said dual entry nozzle in said nozzle arrays being adapted to produce at its exit aperture a fountain dispersal stream when the valve inlet port is in fluid communication with a source of liquid pressure, each said dispersal stream being movable in uniplanar arcuate movement in response to actuation of said valve element which places said lateral openings in communication with said valve outlets.

3. A fountain apparatus as set forth in claim 2 wherein each of said first and second arrays of dual entry nozzles are arranged in a circle such that the plane of movement for each nozzle dispersal stream is coincident with the center of said circle.

4. A fountain apparatus as set forth in claim 1 wherein said valve body is provided with first and second pairs of valve outlets and the outlets of each said pair are coaxially aligned with one another in diametrically opposed relationship with respect to the axis of the tubular valve element and wherein said liquid discharge means comprises:

an array of dual entry nozzles, each nozzle in said array having a pair of nozzle entry ports and an exit aperture communicating with both of its nozzle entry ports;

a pair of conduits, each connected at one end to a different one of the first pair of valve outlets with one conduit of said pair of conduits connecting at its other end to one entry port of each dual entry nozzle in said array of dual entry nozzles;

and the other conduit of said pair of conduits connecting at its other end to the other entry port of each dual entry nozzle in said array of dual entry nozzles whereby each dual entry nozzle in said array of dual entry nozzles is adapted to produce at its exit aperture a fountain dispersal stream when the valve inlet port is in fluid communication with a source of liquid pressure, and each said dispersal stream is movable in uniplanar arcuate movement in response to movement of said valve element which places said lateral openings in communication with said valve outlets.

5. A fountain apparatus as set forth in claim 4 wherein said liquid discharge means further comprises a plurality of single entry nozzles mounted in at least one of said conduits, each single entry nozzle being adapted to discharge a unidirectional nozzle dispersal stream when liquid under pressure is communicated thereto from said valve.

6. A fountain apparatus as set forth in claim 1 wherein said valve body is provided with at least one pair of valve outlets which are coaxially aligned with one another in diametrically opposed relationship with respect to the axis of said tubular element and wherein said liquid discharge means comprises at least one multiple entry nozzle having an exit aperture and more than two nozzle entry ports, each nozzle entry port of said multiple entry nozzle being connected to a different one of said valve body outlets whereby the flows of fountain liquid delivered to said nozzle entry ports are merged near the exit aperture of said multiple entry nozzle to form a fountain liquid dispersal stream, the direction and duration of which is controllable by differences in pressure and volume in the flow to said nozzle entry ports.

7. A fountain apparatus as set forth in claim 1 wherein said liquid discharge means comprises a nozzle having an exit aperture and a pair of nozzle entry ports, each nozzle entry port being connected to a different one of said pair of valve outlets whereby the flows of fountain liquid delivered to said pair of nozzle entry ports are merged near the exit aperture of said dual entry nozzle to form a fountain liquid dispersal stream for which the direction and movement thereof is determined by the volume in the flows to said pair of nozzle entry ports.

8. A fountain apparatus for producing fountain streams and sprays wherein the streams and sprays are adapted to move in complex fashion to provide aesthetically pleasing and entertaining displays, said apparatus comprising:

a valve adapted for installation in a fountain liquid circulating system, said valve comprising a valve body having a valve chamber therein and an inlet port and a plurality of outlets in communication with said chamber, said inlet port being adapted for connection in communication with a source of liquid under pressure;

a tubular valve element, said valve element being formed with a longitudinal axis and a hollow interior with an entry port at one end and a plurality of lateral openings in communication with said entry port, said valve element being mounted in said valve chamber with its entry port in fluid communication with the inlet port of the valve body whereby liquid delivered through the inlet port of said valve body is received by said valve element;

liquid discharge means for discharging fountain liquid, said discharge means comprising a dual entry nozzle having an exit aperture for discharging fountain liquid therefrom and a pair of nozzle entry ports;

conduit means for connecting each of said valve outlets with a different one of said nozzle entry ports whereby the flows of fountain liquid delivered to said pair of nozzle entry ports are merged near the exit aperture of said dual entry nozzle to form a fountain liquid dispersal stream, the direction and duration of which is controllable by differences in pressure and volume in the flow to said pair of nozzle entry ports;

means for imparting axial rotation to said valve element at a selected speed and direction of rotation to selectively control the degree and duration of fluid communication of said valve clement lateral openings with said valve outlets; and means for imparting linear axial movement to said valve element at a selected speed and direction of axial movement to further control the fluid communication of said valve element lateral openings with said valve outlets whereby when said valve is connected with its inlet port in communication with a source of liquid under pressure, the valve element may be activated to effect complex movements of the fountain dispersal streams.

9. A fountain apparatus as set forth in claim 8 wherein said valve body is provided with first and second pairs of valve outlets and wherein said liquid discharge means comprises first and second arrays of dual entry nozzles, each nozzle in said arrays having a pair of nozzle entry ports and an exit aperture communicating with both of the nozzle entry ports;

a first pair of conduits, each connecting at one end to a different one of the first pair of valve outlets with one conduit of said first pair of conduits connecting at its other end to one entry port of each dual entry nozzle in said first array of dual entry nozzles and the other conduit of said first pair of conduits connecting at its other end to the other entry port of each dual entry nozzle in said first array of dual entry nozzles;

a second pair of conduits, each connecting at one end to a different one of the second pair of valve outlets with one conduit of said second pair of conduits connecting at its other end to one entry port of each dual entry nozzle in said second array of dual entry nozzles and the other conduit of said second pair of conduits connecting at its other end to the other entry port of each dual entry nozzle in said second array of dual entry nozzles, each said dual entry nozzle in said nozzle arrays being adapted to produce at its exit aperture a fountain dispersal stream when the valve inlet port is in fluid communication with a source of liquid pressure, each said dispersal stream being movable in uniplanar arcuate movement in response to actuation of said valve element which places said lateral openings in communication with said valve outlets.

10. A fountain apparatus as set forth in claim 9 wherein each of said first and second arrays of dual entry nozzles are arranged in a circle such that the plane of movement for each nozzle dispersal stream is coincident with the center of said circle.

11. A fountain apparatus as set forth in claim 10 wherein said first and second arrays of dual entry nozzles are arranged in a pair of concentric circles.

12. A fountain apparatus as set forth in claim 9 wherein said valve body is provided with first and second pairs of valve outlets and wherein said liquid discharge means comprises:

an array of dual entry nozzles, each nozzle in said array having a pair of nozzle entry ports and an exit aperture communicating with both of its nozzle entry ports;

a pair of conduits, each connected at one end to a different one of the first pair of valve outlets with one conduit of said pair of conduits connecting at its other end to one entry port of each dual entry nozzle in said array of dual entry nozzles;

and the other conduit of said pair of conduits connecting at its other end to the other entry port of each dual entry nozzle in said array of dual entry nozzles whereby each so dual entry nozzle in said array of dual entry nozzles is adapted to produce at its exit aperture a fountain dispersal stream when the valve inlet port is in fluid communication with a source of liquid pressure, and each said dispersal stream is movable in uniplanar arcuate movement in response to movement of said valve element which places said lateral openings in communication with said valve outlets.

13. A fountain apparatus as set forth in claim 12 wherein said liquid discharge means further comprises a plurality of single entry nozzles mounted in at least one of said conduits, each single entry nozzle being adapted to discharge a unidirectional nozzle dispersal stream when liquid under pressure is communicated thereto from said valve.

14. A fountain apparatus for producing fountain streams and sprays wherein the streams and sprays are adapted to move in complex fashion to provide aesthetically pleasing and entertaining displays, said apparatus comprising:

a valve adapted for installation in a fountain liquid circulating system, said valve comprising a valve body having a valve chamber therein and an inlet port and a plurality of outlets in communication with said chamber, said inlet port being adapted for connection in communication with a source of liquid under pressure;

a tubular valve element, said valve element being formed with a longitudinal axis and a hollow interior with an entry port at one end and a plurality of lateral openings in communication with said entry port, said valve element being mounted in said valve chamber with its entry port in fluid communication with the inlet port of the valve body whereby liquid delivered through the inlet port of said valve body is received by said valve element;

liquid discharge means for discharging fountain liquid, said discharge means comprising at least one multiple entry nozzle having an exit aperture for discharging fountain liquid therefrom and provided with at least three nozzle entry ports;

conduit means for connecting each of said valve body outlets with a different one of said nozzle entry ports whereby the flows of fountain liquid delivered to the entry ports of said multiple entry nozzle are merged near its exit aperture to form a liquid dispersal stream, the direction and movement of which is controllable by differences in pressure and volume of the flows delivered to its multiple entry ports; and means for imparting linear axial movement to said valve element at a selected speed and direction of axial movement to further control the fluid communication of said valve element lateral openings with said valve body outlets whereby when said valve is connected with its inlet port in communication with a source of liquid under pressure, the valve element may be actuated to effect complex movements of the fountain dispersal streams.

*15. A fountain apparatus for producing fountain streams and sprays wherein the streams and sprays are adapted to move in complex fashion to provide aesthetically pleasing and entertaining displays, said apparatus comprising:*

*valve means for controlling the flow of liquid, said valve means including inlet means adapted for connection in communication with a source of liquid under pressure and valve outlet means comprising at least a pair of outlets;*

*liquid discharge means for discharging fountain liquid, said discharge means comprising at least one nozzle having a plurality of nozzle entry ports adapted to receive liquid therethrough and an exit aperture to allow the flows of liquid through said nozzle entry ports to merge near the exit aperture;*

*conduit means for connecting each of said at least a pair of valve outlets with a different one of the plurality of nozzle entry ports; and*

*means for operating said valve means to selectively control the degree of fluid communication between said valve inlet means and said valve outlet means and said conduit means whereby when said valve inlet means is connected in communication with a source of liquid under pressure, the valve means may be actuated to effect complex movements of the fountain dispersal streams.*

*16. A fountain apparatus as set forth in claim 15 wherein said liquid discharge means comprises first and second arrays of nozzles having a plurality of nozzle entry ports, each nozzle in said arrays having an exit aperture communicating with its plurality of entry ports; and*

*said conduit means comprises a first pair of conduits and a second pair of conduits, each conduit in said first pair of conduits connecting at one end to a different one of said at least a pair of outlets of said valve outlet means with one conduit of said first pair of conduits connecting at its other end to one entry port of each nozzle in said first array of nozzles and the other conduit of said first pair of conduits connecting at its other end to a different entry port of each nozzle in said first array of nozzles; and*

*each conduit in said second pair of conduits connecting at one end to different ones of said at least a pair of valve outlets with one conduit of said second pair of conduits connecting at its other end to one entry port of each nozzle in said second array of nozzles and the other conduit of said second pair of conduits connecting at its other end to a different entry port of each nozzle in said second array of nozzles, each said nozzle in said nozzle arrays being adapted to produce at its exit aperture a fountain dispersal stream when said valve inlet means is in fluid communication with a source of liquid pressure, each said dispersal stream being movable in uniplanar arcuate movement in response to actuation of said valve means which places said valve inlet means in communication with said valve outlet means.*

*17. A fountain apparatus as set forth in claim 16 wherein each of said first and second arrays of nozzles are arranged in a circle such that the plane of movement for each nozzle dispersal stream is coincident with the center of said circle.*

*18. A fountain apparatus as set forth in claim 15 wherein said valve outlet means includes first and second pairs of valve outlets and wherein said liquid discharge means comprises:*

*an array of nozzles, each nozzle in said array having at least a pair of nozzle entry ports and an exit aperture communicating with both of its nozzle entry ports; and*

*said conduit means comprises a pair of conduits, each said conduit being connected at one end to a different one of said at least a pair of valve outlets with one conduit of said pair of conduits connecting at its other end to one entry port of each nozzle in said array of nozzles,*

*and the other conduit of said pair of conduits connecting at its other end to another entry port of each nozzle in said array of nozzles whereby each nozzle in said array of nozzles is adapted to produce at its exit aperture a fountain dispersal stream when said valve inlet means is in fluid communication with a source of liquid pressure, and each said dispersal stream is movable in uniplanar arcuate movement in response to operation of said valve means which places said valve inlet means in communication with said valve outlet means.*

*19. A fountain apparatus as set forth in claim 15 wherein said conduit means comprises a pair of conduits and said liquid discharge means further comprises a plurality of single entry nozzles mounted in at least one of said conduits, each single entry nozzle being adapted to discharge a unidirectional nozzle dispersal stream when liquid under pressure is communicated thereto from said valve means.*

*20. A fountain apparatus as set forth in claim 15 wherein said liquid discharge means comprises at least one multiple entry nozzle having an exit aperture and more than two nozzle entry ports, each nozzle entry port of said multiple entry nozzle being connected to a different one of said valve outlets of said at least a pair of valve outlets whereby the flows of fountain liquid delivered to said nozzle entry ports are merged near the exit aperture of said multiple entry*

*nozzle to form a fountain liquid dispersal stream, the direction and duration of which is controllable by differences in pressure and volume in the flow to said nozzle entry ports.*

*21. A fountain apparatus as set forth in claim 15 wherein said liquid discharge means comprises a nozzle having an exit aperture and a pair of nozzle entry ports, each nozzle entry port being connected to a different one of said pair of valve outlets whereby the flows of fountain liquid delivered to said pair of nozzle entry ports are merged near the exit aperture of said nozzle having a pair of nozzle entry ports to thereby form a fountain liquid dispersal stream for which the direction and movement thereof is determined by the volume in the flows to said pair of nozzle entry ports.*

*22. A fountain apparatus for producing fountain streams and sprays wherein the streams and sprays are adapted to move in complex fashion to provide aesthetically pleasing and entertaining displays, said apparatus comprising:*

*valve means for controlling the flow of liquid, said valve means including valve inlet means adapted for connection in communication with a source of liquid under pressure, valve outlet means comprising at least a pair of outlets, and valve element means adapted for movement to establish communication between said valve inlet means and said valve outlet means;*

*liquid discharge means for discharging fountain liquid, said discharge means comprising at least one nozzle having an exit aperture for discharging fountain liquid therefrom and a plurality of nozzle entry ports adapted to receive liquid therethrough;*

*conduit means for connecting each of said outlets in said at least a pair of outlets with a different one of the nozzle entry ports of said at least one nozzle; and*

*means for operating said valve means to selectively control the degree of fluid communication between said valve inlet means and said valve outlet means and said conduit means by movement of said valve element means whereby when said valve inlet means is connected in communication with a source of liquid under pressure, the valve means may be actuated to effect complex movements of the fountain dispersal streams.*

* * * * *